US008112521B2

(12) United States Patent
Barnett et al.

(10) Patent No.: US 8,112,521 B2
(45) Date of Patent: Feb. 7, 2012

(54) METHOD AND SYSTEM FOR SECURITY MAINTENANCE IN A NETWORK (75) Inventors: Bruce Gordon Barnett, Troy, NY (US); John Erik Hershey, Ballston Lake, NY (US); Daniel Thanos, Stouffville, CA (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 12/712,831

(22) Filed: Feb. 25, 2010

(65) Prior Publication Data
US 2011/0208849 A1 Aug. 25, 2011

(51) Int. Cl.
G06F 15/16 (2006.01)
G06F 15/173 (2006.01)
G06F 15/177 (2006.01)

(52) U.S. Cl. ........ 709/224; 340/541; 340/547; 340/531; 713/153; 726/22

(58) Field of Classification Search .......... 709/217–228; 726/22; 713/153; 340/541, 547, 531
See application file for complete search history.

(56) References Cited

U.S. PATENT DOCUMENTS

| 7,073,198 | B1 | 7/2006 | Flowers et al. | |
|---|---|---|---|---|
| 7,310,669 | B2 | 12/2007 | Webb et al. | |
| 7,453,808 | B2 * | 11/2008 | Qureshi et al. | 370/235 |
| 2004/0128543 | A1 | 7/2004 | Blake et al. | |
| 2006/0126495 | A1 | 6/2006 | Guichard et al. | |
| 2007/0199070 | A1 | 8/2007 | Hughes | |
| 2007/0283441 | A1 * | 12/2007 | Cole et al. | 726/25 |
| 2008/0072035 | A1 * | 3/2008 | Johnson et al. | 713/153 |
| 2008/0138100 | A1 | 6/2008 | Matsuyama | |
| 2008/0317286 | A1 * | 12/2008 | Thorpe et al. | 382/103 |
| 2009/0045976 | A1 | 2/2009 | Zoldi et al. | |
| 2009/0051528 | A1 * | 2/2009 | Graichen | 340/547 |
| 2009/0121869 | A1 * | 5/2009 | Graichen | 340/541 |
| 2009/0138100 | A1 | 5/2009 | Khorramshahi | |
| 2009/0222828 | A1 | 9/2009 | Lefevre et al. | |
| 2009/0228980 | A1 * | 9/2009 | Zingelewicz et al. | 726/22 |
| 2009/0261967 | A1 * | 10/2009 | Chen | 340/531 |
| 2009/0328221 | A1 | 12/2009 | Blumfield et al. | |
| 2010/0025463 | A1 * | 2/2010 | Daroga | 235/382 |
| 2010/0158251 | A1 * | 6/2010 | Risley | 380/255 |

FOREIGN PATENT DOCUMENTS
WO 2007117579 10/2007

OTHER PUBLICATIONS

EP11155342 Search Report, Jun. 21, 2011, pp. 1-8.
K. Yoshioka et al., "Multi-Pass malware Sandbox Analysis with Controlled Internet Connection," IEICE Trans. Fundamentals, vol. E93-A, No. 1, Jan. 2010, pp. 210-218.

* cited by examiner

*Primary Examiner* — Haresh N Patel
(74) *Attorney, Agent, or Firm* — Marie Claire B. Maple (57) ABSTRACT

A system and method for monitoring a network and detecting network vulnerabilities is provided. A communication associated with one or more programs is issued to one or more devices in a network and the response from the devices is detected and analyzed. Based on the analysis, a device response is identified as a threat response if it represents at least an alert, an unexpected response or a response time-out indicating that the device did not response to the communication. The vulnerability of the network is determined based on the threat responses of the devices.

17 Claims, 5 Drawing Sheets

METHOD AND SYSTEM FOR SECURITY MAINTENANCE IN A NETWORK

BACKGROUND

A modern society is served by utilities that must function properly at almost all times. Proper functioning is typically expressed by reliability, availability, accountability, and certifiability, the latter term meaning the ability of a user of a utility to actively query and learn the status of the utility. In order to meet the growing demands while providing reliability and efficiency, utilities, such as electric utilities, are developing and implementing technologies to create an intelligent infrastructure, such as a "smart grid" infrastructure of the power grid.

In order to realize an intelligent infrastructure, there must be an embedded or overlaid communications architecture by which components in the network structure can be accessed and controlled. Unfortunately, there is much ongoing, and indeed increasing, malicious cyber activity directed to harming the utility infrastructure. Trojan horses, viruses, and computer worms, for example, are often deployed and improved in order to disrupt the utility metering functions and other communications in the utility network.

In order to limit the potential damage of the cyber security threat, efforts are underway to enable awareness of potential threat events as well as their details and effects in order to harden the utility communication infrastructure both proactively and in response to incidents.

For these and other reasons, there is a need for the present invention.

SUMMARY

A system and method for monitoring a network and detecting network vulnerabilities is provided. A communication associated with one or more programs is issued to one or more devices in a network and the response from the devices is detected and analyzed. Based on the analysis, a device response is identified as a threat response if it represents at least an alert, an unexpected response or a response time-out indicating that the device did not response to the communication. The vulnerability of the network is determined based on the threat responses of the devices.

BRIEF DESCRIPTION OF THE DRAWINGS

The nature and various additional features of the invention will appear more fully upon consideration of the illustrative embodiments of the invention which are schematically set forth in the figures. Like reference numerals represent corresponding parts.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

The embodiments described herein are directed to security maintenance in a network of power grid devices. While embodiments of the invention will be described in the context of energy or electric utility networks, it will be appreciated by those skilled in the art that the method and system can be used for other types of networks as well.

As used herein, the term "module" refers to software, hardware, or firmware, or any combination of these, or any system, process, or functionality that performs or facilitates the processes described herein.

In a power utility network, utility meters are necessary components to provide important information to the customer as well as the utility. As meter and communication technology have advanced, it has become possible to remotely read the utility meters. In addition, it has also become possible for utilities to remotely control meters. Such remote control includes remotely turning off of a particular subscriber's power, for example. As the power grid becomes "smarter" with advancing technologies, communication between grid devices, customers, and the utilities will increase. As with any communication network, there is a danger that the grid or network will be vulnerable to cyber attacks.

Figure 1:
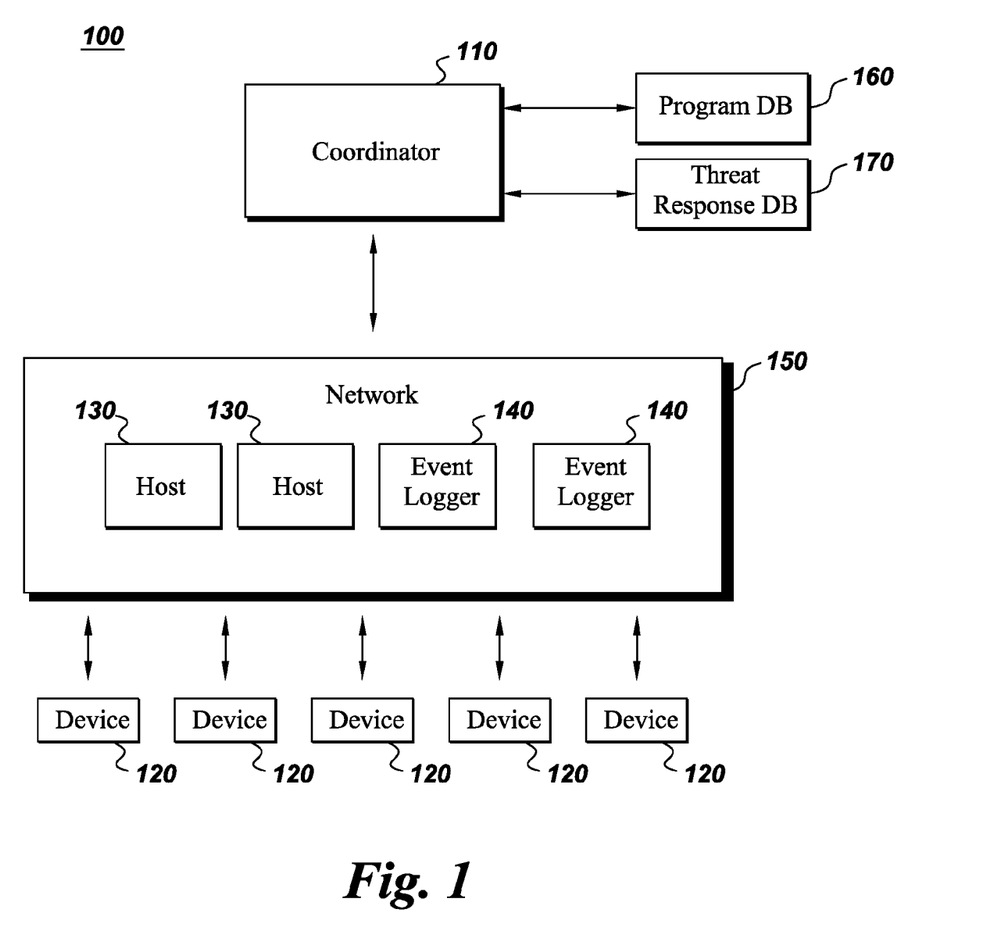
FIG. 1 illustrates a network security maintenance system according to an embodiment of the invention.

An exemplary network security maintenance or monitoring system according to an embodiment of the invention is shown in FIG. 1. The system 100 includes a coordinator 110 coupled to devices 120, host devices 130, and event loggers 140 via a network 150. A program database 160 and a threat response database 170 are coupled to the coordinator 110. The program database 160 stores various programs, including programs for monitoring and testing the network, for example. In order to facilitate the description of the embodiments of the invention, a single coordinator 110, and a small number of devices 120, host devices 130, and event loggers 140, are shown in FIG. 1. However, it should be understood that embodiments of the invention are not limited to these numbers, and that there can be any number of coordinators 110, devices 120, host devices 130, and event loggers 140 in the network. In another embodiment, the functionality of these devices may co-exist. For example, the host 130, event logger 140, device 120, emulator device 210, and the coordinator 110 may be multiple functions existing on a single host.

In the example discussed herein, the coordinator 110 can be arranged at and/or hosted by a utility or by any other party. Some implementations may have multiple coordinators that operate in parallel, and some implementations will have communication between coordinators.

In the exemplary embodiment, the devices 120 are utility meters associated with utility customers. In other embodiments, the devices 120 can be substations, relays, distributed automated control, reclosers, line switches, and capacitor banks. The devices 120 can also include one or more honeypots. The devices 120 can be any device found in a network environment.

The programs in the program database 160 can be active or passive programs to probe the devices 120 for vulnerability to cyber threats. More particularly, the program may intentionally send a communication that should cause an alert or that should cause the device being probed to fail. The program could also probe the device by sending a proper communication to the device and determine device failure based on response.

Event loggers receive information from the devices under test. They may store these messages and/or forward them to another device. They may retain a collection of log events, and allow other programs to examine these events for purposes of detection, correlation, and alarm notification. Results may be kept in a file, or a database. Other processes can examine these events, looking for specific events based on the device name reporting the event, timestamp, a pattern in the event message, etc. Some systems may have multiple event loggers, and others may use a centralized database that allows queries. Embodiments of this invention support distributed and centralized event loggers. The coordinator examines the events for purposes of correlation of information.

Figure 2:
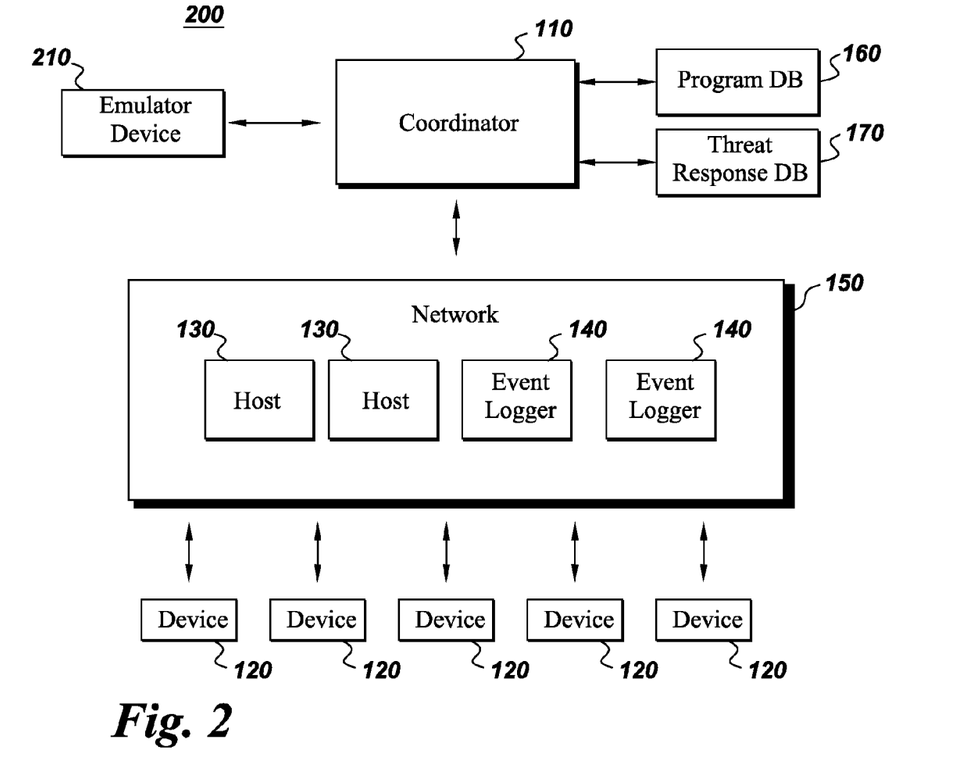
FIG. 2 illustrates a network security maintenance system according to another embodiment of the invention.

FIG. 2 illustrates another exemplary embodiment of the present invention. In the system 200, an emulator device 210 is coupled to the coordinator 110 and to the threat response database 170. Although only one emulator device 210 is shown, it should be understood that embodiments of the invention are not limited to this number, and that there can be any number of emulator devices 210. There may be a plurality of device emulators, simulating cases in virtual environments. In the exemplary embodiment of meters as devices in the network, there may be a plurality of meter emulators that include real meters with software and/or hardware modifications that analyze the behavior of the meter.

The device emulator 210 can also be probed to determine what the appropriate response should be. In one case, the threat emulator 210 takes known threats stored in the threat response database 170 and runs the tests or programs to obtain data that may be characterized. In addition, the threat response database 170 can be validated first on the emulator device 210 before it is sent out to the devices 120. In this manner, data for desired test cases can be generated. In other words the emulator device 210 can be used for security design verification and security deployment verification.

Figure 3:
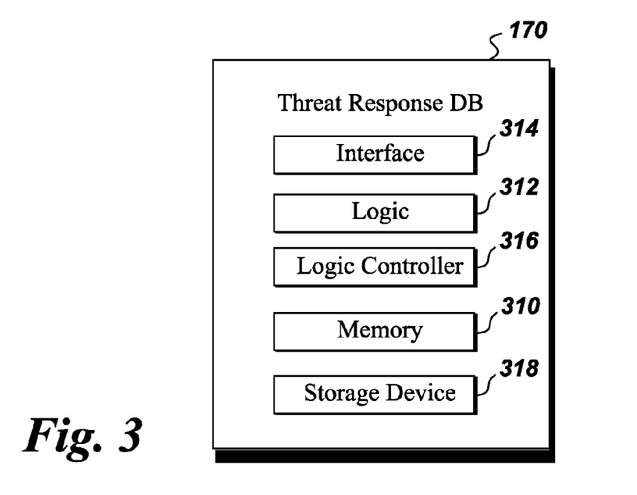
FIG. 3 illustrates an exemplary threat response database according to an embodiment of the invention.

FIG. 3 illustrates an exemplary embodiment of the threat response database 170. The threat response database 170 includes primarily, and in some cases solely, of an archival unit or memory 310 and logic 312 including a search engine, and, secondarily and optionally, a communication origination unit or interface 314 and a logic controller 316. The memory 310 receives and stores threat responses from queried network devices 120. The threat response DB 170 can also include a storage device 318, such as a disk, an array of disks such as a RAID (Redundant Array of Inexpensive Disks), etc.

The logic 312 and logic controller 316 respond to requests for retrieval of archived threat responses for the purpose of analyzing contemporary threat responses.

The optional interface 314 and logic controller 316 may be used to conduct an interrogation of a device 120 that has returned a threat response. As an example, some threat responses may be indicative of a plurality of threat conditions. In order to identify the specific threat condition from among the plurality of possible threat conditions, it may be possible for the logic controller 316 to cause the interface 314 to originate a series of communications addressed to the device 120 that returned the threat response, where the series of communications, and the device response to the series, are so devised and analyzed to eliminate the threat ambiguity and identify the specific threat condition.

The network 150 may be wired, or wireless using such communications as the ZigBee, WiFi, WiMAX, HomePlug architectures, or a hybrid architecture comprising wired and wireless components. Communications between the devices 120, host devices 130, event loggers 140, and the coordinator 110 include the alerts, alarms, and infrastructure directives.

The coordinator 110 serves as a monitoring and verification center. It receives information from the network 150 and the devices 120 of received messages that are automatically recognized as improper or sufficiently unusual. An example of an improper or sufficiently unusual message may be a packet this is not easily generated using standard components such as a packet that is improperly signed. The coordinator 110 can be a spatially diverse set of computational and control modules. The coordinator 110 or devices 120 in the network 150, may generate proper and/or improper packets. For example, a device may generate packets that are improperly constructed, or improperly encrypted and/or authenticated. Devices under test would normally reject such packets if they are functioning properly. Therefore, a device might transmit a packet that should cause the device under test to send an event to an event logger.

The coordinator 110 can request that the network 150 or a device 120 encapsulate and forward an improper or sufficiently unusual message to the device under test. Some implementations of the device may ignore the improper packet. Other implementations may keep track of the number of times malformed packets were received, and may report them to the event logger on a regular basis. Other implementations or embodiments can have the device 120 generate an alert or alarm, or report of improper activity, which is sent to the event logger when the packet is detected.

According to another embodiment of the invention, the coordinator 110 issues the improper or sufficiently unusual message to a device emulator 210 to assess the message's potency for degrading the cyber security of the network. The emulator device 210 emulates a version of the system with special modifications, such as a device that emulates the hardware and/or the network topology of one or more devices. For example, the device may emulate the hardware that corresponds to a meter. Another possible modification includes changes in the software to detect every location of a branch in the program, with counters to keep track of the number of times each branch was taken. This is used to determine test coverage such as, for example, in conducting a test to check that every logic branch has been explored in the firmware. Logic branches that have not been reached indicate areas of the program that have not been executed, and therefore may contain undetected bugs in the logic of the program. The emulator device 210 can also detect improper device activity and usage. In another embodiment, the emulator device 210 or the device 120 is asked to process a special test involving all of its programming and its keying cryptovariables to produce a word or crypto-based verification code that can be checked by the emulator device 210 to assess whether successful malicious reprogramming has been performed on the device 120. According to one embodiment of the invention, the emulator device 210 is realized on a special test bed that is itself properly firewalled.

According to an embodiment of the invention, the coordinator 110 or the emulator device 210 searches the threat response database 170 to see if the received message has been previously encountered. If the message is new to the coordinator 110 and if the emulator device 210 determines that the message poses a new cyber security threat, then the message is added to the threat response database 170.

According to embodiments of the invention, the coordinator 110 performs functions such as, but not limited to, querying the device for firmware versions and system configurations, upgrading the firmware in one or more device, measuring the effectiveness of the device to detect, reject, and report improper packets, vulnerability analysis of the devices, including tests which detect device vulnerabilities, and exploit device vulnerabilities, intrusion detection and prevention, restructuring the communications infrastructure, such as, for example, changing the members of a network, instantiating new networks, setting up and maintaining honey pots, including software updates designed to interoperate with smart devices or other components of the network, and modifying network communication protocols to isolate and contain the spread of insinuated malware, for example.

The devices 120 are designed and equipped with sufficiently sophisticated cryptography and cryptographic protocols so that they can perform functions such as, but not limited to, resist replay efforts to confuse command sequences or timing, resist spoofing efforts, such as deliberate changes in the cipher text in an attempt to change the plaintext to an improper command or report, are not vulnerable to a "man-in-the-middle" attack, and may be securely removed from one network and installed in another network. As a non-limiting example, cryptography that is capable of meeting these desiderata, may be achieved by instantiating a plurality of cryptographic keying variables within each device with one of the plurality of keying variables unique to the device, the unique crypto variable to be used for such purposes as external re-keying of the other crypto variables and resetting of essential security features, operating the device cryptography in a mode, such as cipher-feedback, that causes significant changes in the plaintext with a single symbol change in the cipher text, and providing the device cryptography with an externally interrogatable counter that will allow for only a single execution of a successfully decrypted message.

Figure 4:
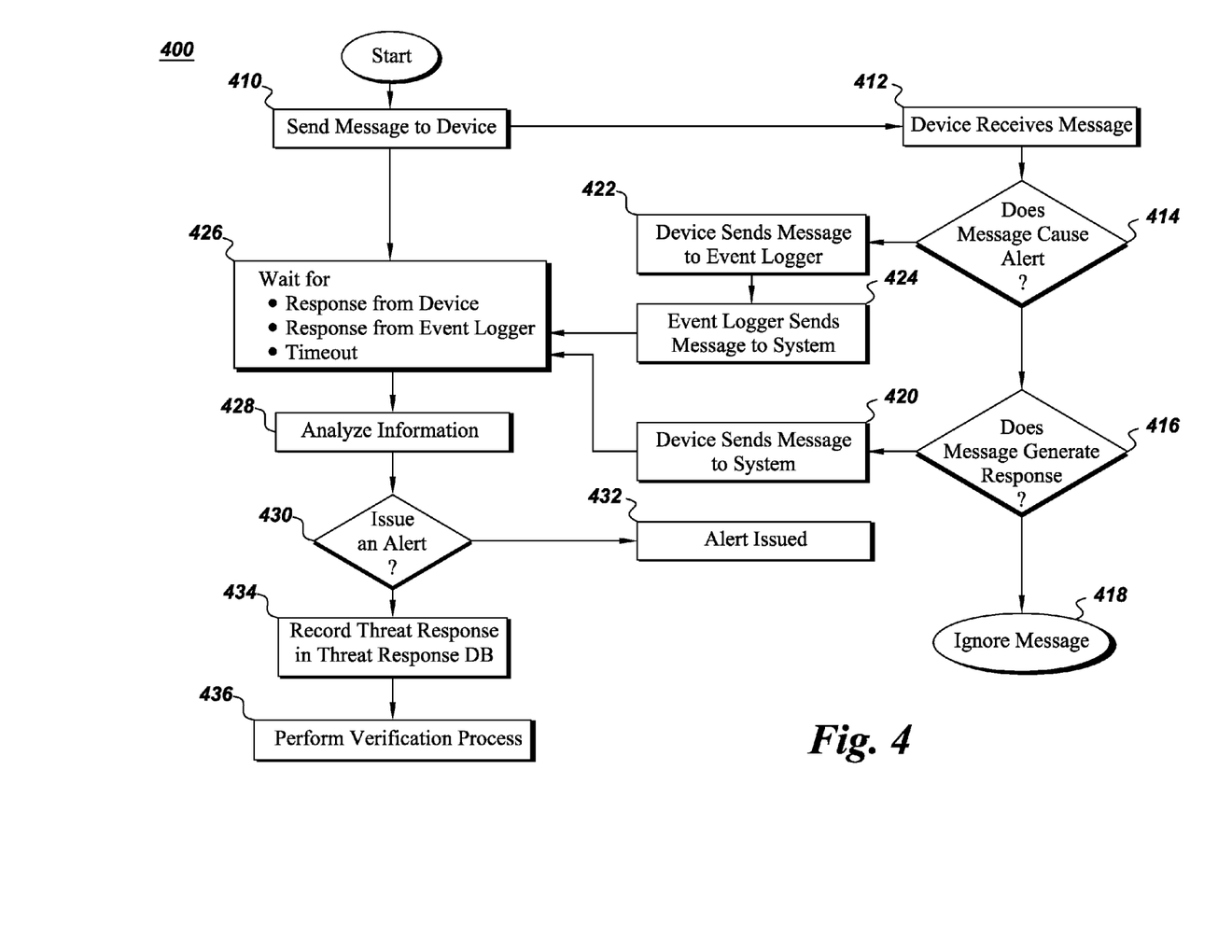
FIG. 4 illustrates a flow diagram of a device monitoring process associated with the system depicted in FIGS. 1 and 2, according to an embodiment of the invention.

FIG. 4 shows a flow diagram for testing or monitoring devices in a network according to an embodiment of the invention. In the process 400, the coordinator 110 exchanges information with the devices 120, host devices 130 and the event loggers 140. The coordinator 110 also exchanges information with the program database 160 and the threat response database 170. The information is used to determine whether the network is vulnerable to cyber threat agents. In step 410, the coordinator 110 sends a message to a device 120. In step 412, the device 120 receives the message, and in step 414, the device 120 determines whether the message is improper or sufficiently unusual as to issue an alert. If no alert is issued, then step 416 is performed to determine whether the device 120 will respond to the message. In some situations. Some messages may contain data that triggers an error in the logic of the program, and may cause the device to perform an unexpected logic branch. This may cause an exception, or cause the device to stop functioning. A watchdog timer may cause the device to re-initialize as part of the error recovery process. If the device 120 does not respond, then step 418 is performed and the device 120 ignores the message. If the device 120 responds to the message, the device sends the response to the coordinator in step 420.

If an alert is issued in step 414, then the device 120 sends a message to an associated event logger 140 in step 422. An example of a message that may cause an alert is a message that has not been properly authenticated, improperly formatted, or a request to perform an action that the device knows is invalid. It may be an attempt to upload firmware that fails the verification process. In general, the device detects a message that it knows is invalid for a variety of reasons. As this may indicate some attempt to "hack" into the device, an alarm to the event logger may be sent. The event logger 140 stores information corresponding to the alert event and sends an alert message to the coordinator 110 in step 424. In step 426, the coordinator waits to receive either a response from the device 120, an alert message from the event logger 140, or generates a timeout when no response is received after a predetermined period of time. In some situations, the coordinator 110 can receive both a response from the device as well as an alert message from the event logger 140. This could happen when an improper request is sent to the device. The device may indicate that the request was invalid by sending a packet with an error response to the device that sends the message. The device may also report this invalid request to the event logger as an attempt to perform an unauthorized request.

In step 428, the coordinator 110 analyzes the information received in response to the message sent to the device 120. The information can be analyzed in any manner suitable to the application such as, but not limited to, comparing the information with stored data, or probabilistic data analysis, for example. The information can be analyzed locally at the device or the host device before it is sent to the coordinator 110, or it can be analyzed by the coordinator 110.

In step 430, the coordinator determines whether an alert should be issued based on the analyzed information. If the information is sufficiently unexpected or unusual, the coordinator 110 will issue an alert in step 432 indicating that the associated device is vulnerable. If an alert is issued, either by the coordinator 110 or by the device 120, or if a timeout event occurs, the response is stored in the threat response database 170 in step 434. Finally, a device verification process is performed in step 436.

The process 400 can be performed in a variety of applications. For example, the process 400 can be performed for each device 120 in the network for each program stored in the program database 160. It can also be performed for one device 120 in the network for every program in the program database 160, or for one program in the program database 160 on all of the devices 120, or for one program on one device 120, and in any other manner suitable to the application. The process 400 is initiated by an initiation event. An initiation event includes a change in the network configuration, for example, the addition, removal, or modification of one or more devices 120 or some other device in the network, or the addition, removal, or modification of one or more of the programs in the program database 160, among other changes. It could also be initiated based on some time data, for example, periodically, or based on other criteria such as time since last program run, program version, location of devices, etc. The process can also select programs to run intelligently, for example rule based decision. In addition, the process 400 can be initiated by the coordinator 110 or user initiated.

Figure 5:
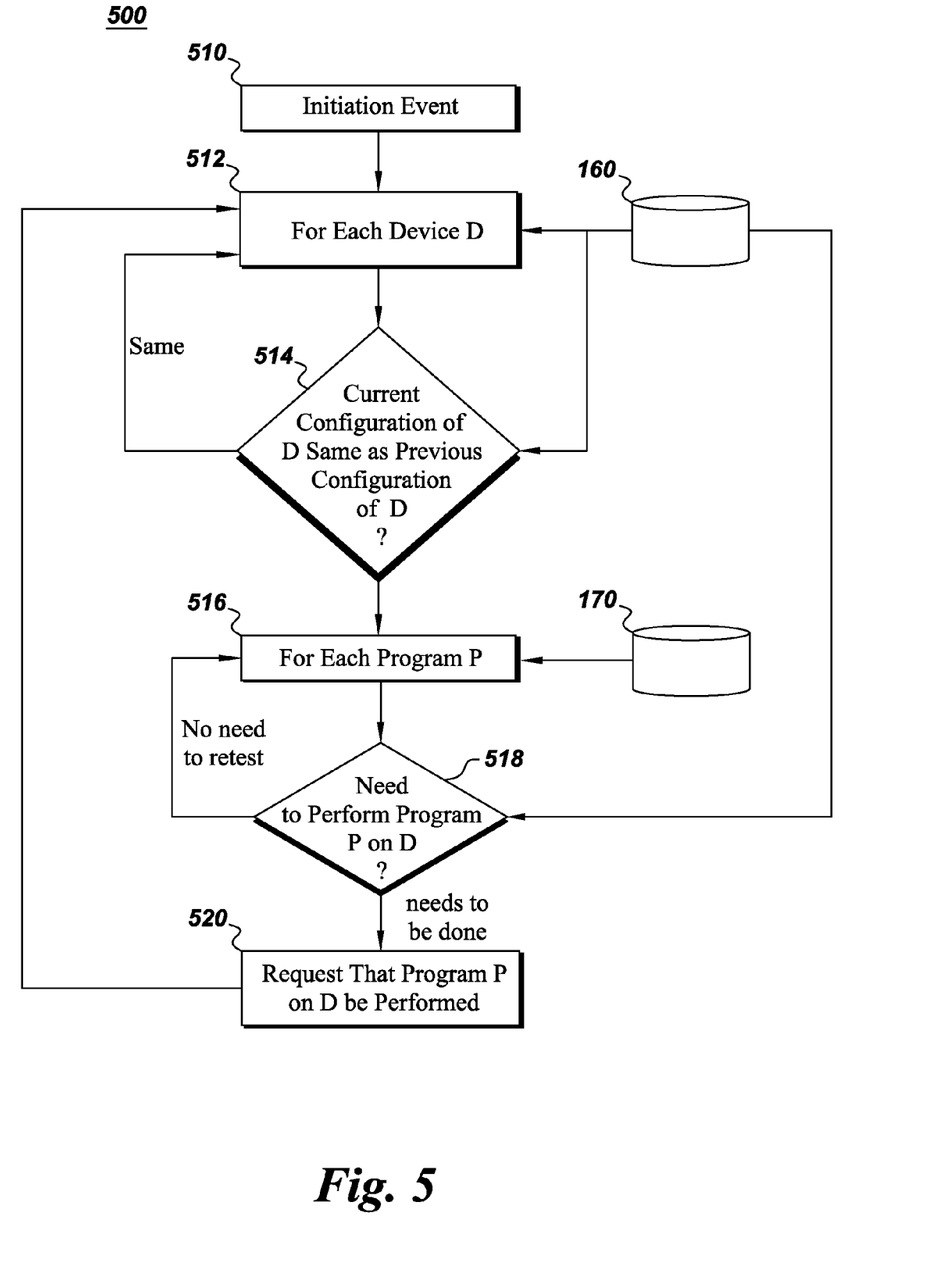
FIG. 5 illustrates a flow diagram of an exemplary device monitoring initiation process according to an embodiment of the invention.

FIG. 5 illustrates an exemplary initiation process 500 according to one embodiment of the invention. An initiation event is detected in step 510, and each device is considered in step 512. In step 514, it is determined whether the configuration of the device 120 is the same as the previous configuration. This includes determining whether the device is new to the network. If the configuration of the device is the same, then the process returns to step 512 to retrieve information for the next device 120. If it is determine that the configuration has changed in step 514, then processing continues to step 516 and for each test or program in step 516 it is determined whether the program should be performed on the device 120 in step 518. If the program is not to be performed the process returns to step 516 and retrieves information for the next program in the program database 160. If the program is to be performed, processing continues to step 520 and the program is run on the device 120. When the processing on the associated device 120 is completed, processing returns to step 512.

The example shown in FIG. 5 contemplates running each program on each device, however, the invention is not limited in this regard as discussed above. Other means of optimizing this control loop are possible. The check may be for the test first, and then iterate through the possible devices. There may be other selection options, such as geographic location, time of last test, priority of test, etc.

According to embodiments of the invention, the coordinator 110 can elect to perform the process or delegate the operation to one or more delegates or host devices 130 in the network 150. In this manner, multiple programs can be initiated and processed simultaneously or substantially simultaneously for parallel processing. The coordinator 110 can also delegate a portion of the processing to a host device 130 in the network 150. In other embodiments, the host device 130 may further delegate processing of a program to another host device 130 such that the initial host device 130 becomes a master device and the second host device 130 becomes the slave, and so on.

Figure 6:
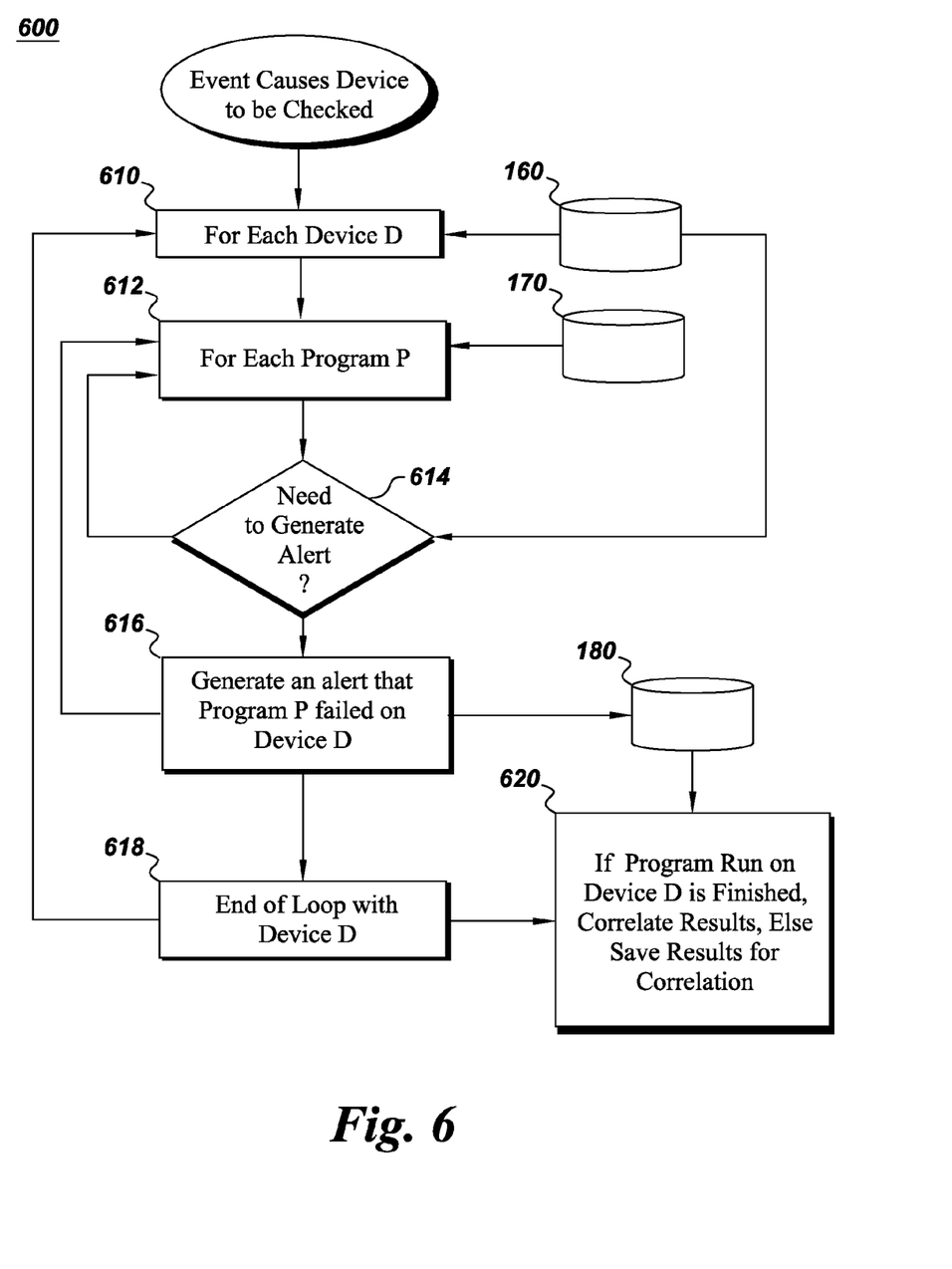
FIG. 6 illustrates a flow diagram of an exemplary verification process according to an embodiment of the invention.

FIG. 6 shows a flow diagram of a verification process 600. In steps 610 and 612, the responses for each program performed on each device are analyzed. In step 614, it is determined whether an alert should be issued based on the analysis. If no alert is issued, processing returns to step 612 to obtain the responses for the next program from the associated device identified in step 610. If it is determined that an alert should be issued, processing continues to step 616 and an alert is issued indicating that the program failed on the associated device indicating a vulnerability in the device. Processing returns to step 612 for the next program. Step 618 determines the end of processing for a device and processing continues to step 610 to the next device. The program results are stored in results database 180. The emulator device 210 can be included in the devices analyzed and verified in process 600. The verification process can occur based on some time or it could be initiated by a user or other suitable time. The verification process is policy driven. When processing is completed for a device, processing continues to step 620 where the results are correlated and/or stored.

Embodiments of the invention may wait until multiple tests are performed, and by examining the results, may reach a conclusion to the cause of the test results, such as a hardware failure, software bug in the firmware, timing error or a race condition. Other test results may not need to be correlated, such as the verification of the firmware version. Other failures could be caused by a failed component that communicates to the device under test, such as a device acting as a router.

In summary explanation, exemplary embodiments of the invention provide a method and system for monitoring a network to detect network vulnerabilities to cyber attacks. Embodiments of the invention correlate information between multiple events where events are both normal traffic and alerts generated by devices. The analysis is performed based on combination of alerts, normal responses and lack of responses to determine whether there is a security vulnerability.

While some exemplary embodiments of the invention have been described in the context of metering, it will be appreciated by those skilled in the art that the method and system can be used in any communications network While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method, comprising:
issuing a communication associated with one or more programs to one or more devices in a network;
detecting a response to the communication from each of the one or more devices;
detecting an event logger message from an event logger when the one or more devices sends an event logger event message to the event logger in response to the communication;
analyzing, by a hardware processor, the response and the event logger message;
identifying a threat response when at least one of the detected response represents one of an unexpected response or a response time-out indicating a lack of response from the one or more devices, or the event logger message reports an event;
determining a network vulnerability based on identification of the threat response;
sending a follow-up communication to the one or more devices returning the threat response;
detecting a follow-up response from each of the one or more devices returning the threat response; and
analyzing the follow-up response to determine a network threat condition resulting in the threat response.

2. The method of claim 1, further comprising:
detecting an initiation event; and
initiating the issuance of the communication to the one or more devices when the initiation event is detected.

3. The method of claim 1, further comprising:
sending a delegation communication from a master device in the network to one or more delegate devices in the network to process at least a portion of the one or more programs.

4. The method of claim 1, further comprising:
for each of the one more devices, generating a device alert when the threat response represents a device failure for the one or more programs.

5. The method of claim 1, further comprising:
running the one or more programs on an emulator device, comprising:
issuing the communication associated with one or more monitoring programs to the emulator device;
detecting an emulator response to the communication from the emulator device;
identifying the emulator response as an emulator threat response when the response represents one of an alert, an unexpected response, or a response time-out indicating a lack of response; and
determining a vulnerability of the emulator device based on identification of the threat response.

6. The method of claim 5, further comprising:
running the one or more programs on the emulator device simultaneously with issuing the communication to the one or more devices.

7. The method of claim 1, further comprising:
running the one or more programs on the emulator device prior to issuing the communication to the one or more devices in the network.

8. A non-transitory computer-readable medium comprising computer-readable instructions of a computer program that, when executed by a processor, cause the processor to perform a method, the method comprising:
issuing a communication associated with one or more programs to one or more devices in a network;
detecting a response to the communication from each of the one or more devices;

detecting an event logger message from an event logger when the one or more devices sends an event logger event message to the event logger in response to the communication;

analyzing, by a hardware processor, the response and the event logger message;

identifying a threat response when at least one of the detected response represents one of an unexpected response or a response time-out indicating a lack of response from the one or more devices, or the event logger message reports an event; and determining a network vulnerability based on identification of the threat response;

sending a follow-up communication to the one or more devices returning the threat response;

detecting a follow-up response from each of the one or more devices returning the threat response; and analyzing the follow-up response to determine a network threat condition resulting in the threat response.

9. The non-transitory computer-readable medium of claim 8, wherein the method further comprises:

detecting an initiation event; and initiating the issuance of the communication to the one or more devices when the initiation event is detected.

10. The non-transitory computer-readable medium of claim 8, the method further comprising:

sending a delegation communication from a master device in the network to one or more delegate devices in the network to process at least a portion of the one or more programs.

11. The non-transitory computer-readable medium of claim 8, the method further comprising:

for each of the one more devices, generating a device alert when the threat response represents a device failure for the one or more programs.

12. The non-transitory computer-readable medium of claim 8, the method further comprising:

running the one or more programs on an emulator device, comprising:

issuing the communication associated with one or more monitoring programs to the emulator device;

detecting an emulator response to the communication from the emulator device;

identifying the emulator response as an emulator threat response when the response represents one of an alert, an unexpected response, or a response time-out indicating a lack of response; and determining a vulnerability of the emulator device based on identification of the threat response.

13. The non-transitory computer-readable medium of claim 12, the method further comprising:

running the one or more programs on the emulator device simultaneously with issuing the communication to the one or more devices.

14. The non-transitory computer-readable medium of claim 13, the method further comprising:

running the one or more programs on the emulator device prior to issuing the communication to the one or more devices.

15. A system, comprising:

a coordinator device, being a hardware processor, connected to a network;

a program database coupled to the coordinator device for storing programs; and a threat response database coupled to the coordinator device for storing threat responses associated with devices connected to the network;

wherein the coordinator device comprises a coordinator module configured to:

issue a communication associated with one or more programs to one or more devices in a network;

detect a response to the communication from each of the one or more devices;

detect an event logger message from an event logger when the one or more devices sends an event logger event message to the event logger in response to the communication;

analyze, by a hardware processor, the response and the event logger message;

identify a threat response when at least one of the detected response represents one of an unexpected response or a response time-out indicating a lack of response from the one or more devices, or the event logger message reports an event; and determine a network vulnerability based on identification of the threat response;

send a follow-up communication to the one or more devices returning the threat response;

detect a follow-up response from each of the one or more devices returning the threat response; and analyze the follow-up response to determine a network threat condition resulting in the threat response.

16. The system of claim 15, further comprising:

an emulator device coupled to the coordinator device, wherein the emulator device emulates the one or more devices on the network.

17. The system of claim 15, further comprising:

delegate devices connected to the network for performing at least a portion of the programs on the one or more devices.

* * * * *